C. A. WAKEFIELD.
Seed Planter.
No. 7,109.
Patented Feb. 19, 1850.
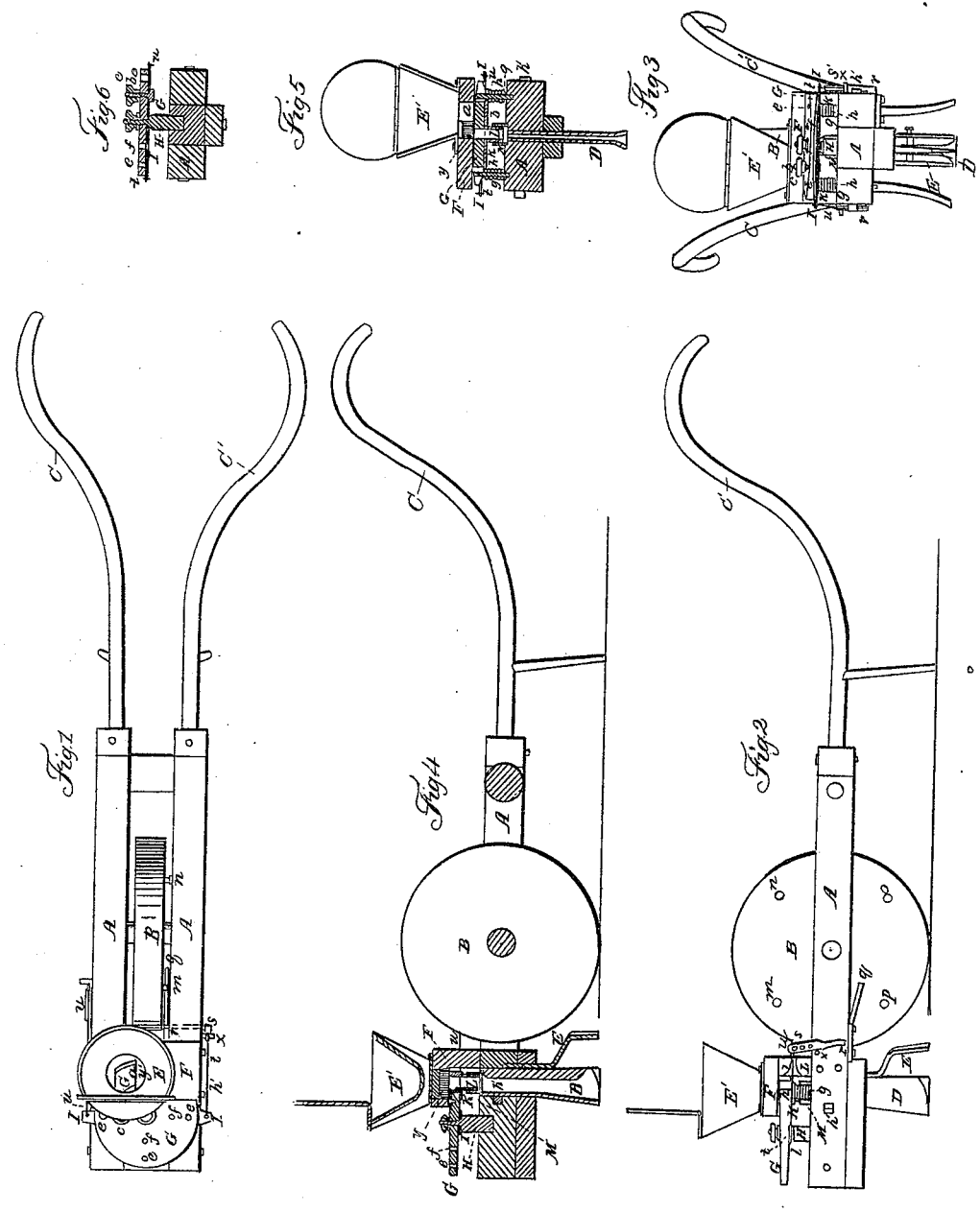

UNITED STATES PATENT OFFICE.

CHAS. A. WAKEFIELD, OF ESSEX COUNTY, NEW YORK.

IMPROVEMENT IN SEED-PLANTING BARROWS.

Specification forming part of Letters Patent No. 7,109, dated February 19, 1850.

*To all whom it may concern:*

Be it known that I, CHARLES A. WAKEFIELD, of the county of Essex and State of New York, have invented a certain new and useful Improvement in Machinery for Planting Seed; and I do hereby declare the same to be fully described and represented in the following specification and accompanying drawings, letters, figures, and references thereof.

Of the said drawings, Figure 1 denotes a top view of my improved seed-planter. Fig. 2 is a side elevation of the same. Fig. 3 is an elevation of the front end of it. Fig. 4 is a vertical central and longitudinal section of it. Fig. 5 is a transverse and vertical section of it, taken through the spring face-plate and its springs, the vibrating plate of variable thickness, and the hopper. Fig. 6 is a transverse and central section of the circular plate of variable thickness, together with its attachment-bar, confining-screws, and turning or supporting post.

In the said drawings, A represents the main frame of the machine, which, like a wheelbarrow, is mounted and moves on a wheel, B, and has two handles, C C', extended from it, all as seen in the drawings. Directly in front of the wheel B the furrow-opener D and the coverer E are arranged, as seen in Figs. 2, 3, and 4, there being nothing essentially new in the same.

E' is a hopper for containing the seed to be dropped or sown. It is placed on a small platform, F, raised above the frame A and in front of the wheel B, although not exactly in the plane of the same. Directly underneath the said platform the vibrating plate, of variable thickness, G, is disposed, there being a passage-way, $a$, made from the hopper and down through the platform F, so as to permit the seed put within the hopper to rest against the top surface of the circular plate G. This plate G is supported on the top of a vertical and stationary post, H, and so as to be capable of being freely revolved, either wholly or partially, in a horizontal direction, the said plate being secured to a bar or lever, I, which is placed directly under it, and turns with it upon the post H. This bar and the plate are confined together by a screw-bolt, $b$, and a nut, $c$, the screw-bolt being passed upward through both and made to receive the nut $c$, as seen in Fig. 6. The plate G is a gage-plate, and is made to contain holes $e\ e\ e$ of different depths, the said holes being arranged in the circumference of a circle. It also has a series of other holes, $f f f$, &c., there being the same number of holes $f f$ as there are holes $e\ e$. Each hole $e$ is in a radial line with one of the holes $f$. The gage-plate G is borne up against the under side of the platform F by means of a face-plate, K, which slides on rods $h\ h$, and is pressed upward by springs $g\ g$, arranged as seen in the drawings. From the middle part of the plate K a short tube, L, projects downward and into a tube or passage, M, which extends down into the furrow-opener D and conveys the seed into the same. The furrow-opener slides up into the frame A and is held in place by a key-wedge, $h'$.

The mechanism by which the circular plate G is operated is as follows: Projecting from the side of the wheel B are a series of screw-pins, $m\ n\ o\ p$, which pins, when the wheel is revolved, are successively brought into contact with the straight arm $q$ of a bent lever, $q\ r\ s$, whose fulcrum is at $r$. The arm $s$ of the said lever has one end of a connecting rod or wire, $t$, hooked or jointed to it, the other end of the said wire being jointed to one end of the lever I, whose opposite end is connected by a similar wire, $u$, to a retractive spring, $v$, the whole being arranged as seen in the drawings. Now, when the machine is moved on the ground so as to cause a revolution of the wheel B the arm $q$ of the lever $q\ r\ s$ will be met by each pin $m$, $n$, $o$, or $p$ as it passes by it, and will be depressed so as to turn the lever on its fulcrum, and thereby create a partial revolution of the gage-plate G, and so as to carry under the hopper that seed-hole of it which was directly over the tube L. This being done, and while the arm $q$ remains tangential, or nearly so, to the curve of rotation of the pin, the seed receptacle or hole in the gage-plate will for all practical purposes remain at rest, or with very little movement. Consequently during such interval the seed will have full time to be shaken into and fill the hole, the same being aided by the jar produced on the machine by moving it over and in the earth underneath it. As soon as the pin of the wheel has passed off the lever-arm $q$ the retractive spring $v$ will act and quickly or smartly bring the gage-plate back to its former position, wherein the seed-hole was represented to be directly over the conductor, through which it is conveyed into the furrow. A stud, $x$, projects from the side of the frame A, as seen in Figs. 1 and 2. The lever-arm $s$ is brought up against the stud with such impetus as to cause the seed within the hole of the plate to be jarred out of the same and into the conductor. A brush, $y$, is used in the position seen in Figs. 4 and 5, its object being to prevent the escape of seed from the hopper and to even off the seed within the seed-hole as it passes under it. Such a brush is common to many seed-planters.

My machine can be very easily adapted to sow seed of different kinds and sizes, it being only necessary to change the gage-plate G around upon the bar I, so as to bring the required seed-hole of the said plate into action with the hopper and conductor.

What I claim as my invention is—

The employment of the gage-plate G, of variable thickness, in combination with the movable tube L and face-plate K and its springs, the same being applied to the hopper and conducting-tube leading into the furrow-opener, and the whole being made to operate substantially as specified.

In testimony whereof I have hereto set my signature this 26th day of November, A. D. 1849.

CHAS. A. WAKEFIELD.

Witnesses:
R. H. EDDY,
F. GOULD.